United States Patent
Taoka et al.

(10) Patent No.: US 8,422,574 B2
(45) Date of Patent: Apr. 16, 2013

(54) BASE STATION APPARATUS, USER EQUIPMENT, AND COMMUNICATION CONTROL METHOD IN MOBILE COMMUNICATION SYSTEM

(75) Inventors: Hidekazu Taoka, Tokyo (JP); Nobuhiko Miki, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 568 days.

(21) Appl. No.: 12/663,980

(22) PCT Filed: Jun. 16, 2008

(86) PCT No.: PCT/JP2008/061005
§ 371 (c)(1),
(2), (4) Date: Mar. 19, 2010

(87) PCT Pub. No.: WO2008/156067
PCT Pub. Date: Dec. 24, 2008

(65) Prior Publication Data
US 2010/0183085 A1    Jul. 22, 2010

(30) Foreign Application Priority Data
Jun. 19, 2007 (JP) ................................ 2007-161942

(51) Int. Cl.
*H04K 1/10* (2006.01)
(52) U.S. Cl.
USPC .......... 375/260; 375/262; 375/267; 375/271; 375/299; 375/316
(58) Field of Classification Search .................. 375/259, 375/260, 262, 266, 267, 271, 295, 296, 299, 375/301, 306, 316, 322, 342, 344, 346, 350
See application file for complete search history.

(56) References Cited

U.S. PATENT DOCUMENTS

| 7,629,902 | B2 * | 12/2009 | Zhang et al. .................. 341/106 |
| 7,729,442 | B2 * | 6/2010 | Kim et al. ...................... 375/295 |
| 7,898,948 | B2 * | 3/2011 | DiGirolamo et al. ......... 370/230 |
| 8,155,070 | B2 * | 4/2012 | Lee et al. ....................... 370/329 |
| 8,311,489 | B2 * | 11/2012 | Alexiou et al. ................. 455/69 |

(Continued)

FOREIGN PATENT DOCUMENTS

| JP | 2010-525684 | 7/2010 |
| WO | 2006/098111 A1 | 9/2006 |
| WO | 2008/131352 A1 | 10/2008 |

OTHER PUBLICATIONS

International Search Report w/translation from PCT/JP2008/061005 dated Aug. 19, 2008 (4 pages).
3GPP TSG-RAN WG1 #50bis, R1-074225; "Considerations on DL Signaling for Support of SU- and MU-MIMO"; ZTE; Shanghai, China; Oct. 8-12, 2007 (3 pages).

(Continued)

Primary Examiner — Hirdepal Singh
(74) Attorney, Agent, or Firm — Osha Liang LLP

(57) ABSTRACT

A disclosed base station apparatus is capable of communicating with a user equipment terminal in a multi-input multi-output (MIMO) mobile communication system using Pre-coding. The base station apparatus includes a receiving unit receiving a Pre-coding Matrix Indicator (PMI) indicating a specific Pre-coding matrix, a determination unit determining a value of a flag indicator indicating whether the Pre-coding matrix specified in the PMI is to be used for downlink communications, a control signal generation unit generating a downlink control signal including at least the flag indicator, and a transmission unit transmitting a signal including the downlink control signal in downlink.

17 Claims, 10 Drawing Sheets

U.S. PATENT DOCUMENTS

| | | | | |
|---|---|---|---|---|
| 2006/0276212 A1* | 12/2006 | Sampath et al. | ............... | 455/513 |
| 2008/0260059 A1* | 10/2008 | Pan | ............................... | 375/260 |
| 2009/0002235 A1 | 1/2009 | Ito | | |
| 2009/0006925 A1* | 1/2009 | Pan | ............................... | 714/758 |
| 2011/0280342 A1* | 11/2011 | Kim et al. | ..................... | 375/316 |
| 2012/0275536 A1* | 11/2012 | Khojastepour et al. | ........ | 375/267 |

OTHER PUBLICATIONS

TSG-RAN WG1#52, R1-081016; "Downlink Control channels: formats and contents"; NEC Group; Sorrento, Italy; Feb. 11-15, 2008 (6 pages).

TSG-RAN WG1 #50, R1-073870; "Notes from offline discussions on PDCCH contetns"; Discussion moderator (Ericsson); Athens, Greece; Aug. 20-24, 2007 (3 pages).

3GPP TR 25.814, v7.0.0; "Physical layer aspects for evolved Universal Terrestrial Radio Access (UTRA)"; Jun. 2006 (126 pages).

3GPP TSA RAN WG Meeting #47bis, R1-070103; "Downlink L1/L2 Control Signaling Channel Structure: Coding"; Sorrento, Italy; Jan. 15-19, 2007 (17 pages).

Office Action in Japanese Patent Application No. 2007-161942 mailed Oct. 5, 2010, with partial English translation thereof (4 pages).

* cited by examiner

BASE STATION APPARATUS, USER EQUIPMENT, AND COMMUNICATION CONTROL METHOD IN MOBILE COMMUNICATION SYSTEM

TECHNICAL FIELD

The present invention generally relates to a technical field of mobile communications, and more particularly to a base station apparatus, a user equipment (UE) terminal, and a communication control method in a mobile communication system using plural antennas.

BACKGROUND ART

Research and development of a next-generation communication system have been continued at high speed. As the next-generation communication system of the W-CDMA (Wideband Code Division Multiple Access) system or the HSDPA (High Speed Downlink Packet Access) system, an LTE (Long Term Evolution) system has been studied by 3GPP ($3^{rd}$ Generation Partnership Project) which is a standards body of the W-CDMA. More specifically, in the LTE system as a radio access system, an OFDM (Orthogonal Frequency Division Multiplexing) scheme and an SC-FDMA (Single-Carrier Frequency Division Multiple Access) scheme have been studied to be applied to the downlink communications system and the uplink communications system, respectively (see, for example, Non-Patent Document 1).

The OFDM scheme is a multi-carrier system in which a frequency band is divided into plural sub-carriers having narrower frequency bands and data are mapped onto the sub-carriers so as to be transmitted. By using the orthogonality among the sub-carriers (i.e., independent from each other), the sub-carriers may partially overlap each other on the frequency axis, thereby enabling improving frequency use efficiency and achieving faster transmission rates.

The SC-FDMA scheme is a single-carrier type transmission system in which a frequency band is divided into plural narrower frequency bands so that the divided frequency bands are allocated to plural user equipment (UE) terminals (mobile stations) so that the user equipment (UE) terminals can transmit using different frequency bands, thereby reducing the interference between user equipment (UE) terminals. Further, in the SC-FDMA scheme, a range of the fluctuation of the transmission power may be made smaller; therefore, lower energy consumption of terminals may be achieved and a wider coverage area may also be obtained.

In both uplink transmissions and downlink transmissions of the LTE system, communications are carried out by allocating one or more physical channels shared among plural user equipment (UE) terminals. The channel shared among plural user equipment (UE) terminals is generally called a shared channel. In the LTE system, uplink communications and downlink communications are carried out by using a Physical Uplink Shared Channel (PUSCH) and a Physical Downlink Shared Channel (PDSCH), respectively.

In the communication system using such a shared channel as described above, it is required to perform signaling (a signaling process) to determine which shared channel is to be allocated to which user equipment (UE) terminal with respect to each sub-frame (having one (1) ms period in the LTE system). The control channel used for the signaling in the LTE system is called a Physical Downlink Control Channel (PDCCH) or a Downlink L1/L2 Control Channel (DL L1/L2 Control Channel). Further, data to be transmitted via the Physical Downlink Control Channel (PDCCH) includes, for example, Downlink Scheduling Information, Acknowledgement/Non-Acknowledgement Information (ACK/NACK), Uplink Scheduling Grant, an Overload Indicator, Transmission Power Control Command Bit and the like (see, for example, Non-Patent Document 2).

The Downlink Scheduling Information and the Uplink Scheduling Grant include information items to be used for the signaling determining which shared channel is to be allocated to which user equipment (UE) terminal. Further, the Downlink Scheduling Information may include information items regarding the Physical Downlink Shared Channel (PDSCH), such as allocation information of downlink Resource Blocks, an ID of a user equipment (UE) terminal (mobile station), the number of streams when MIMO (Multi-Input Multi-Output) communications are performed, information of Pre-coding Matrix, data size, modulation scheme, information of an HARQ (Hybrid Automatic Repeat reQuest) and the like. Further, the Uplink Scheduling Grant may include information items regarding the Physical Uplink Shared Channel (PUSCH), such as allocation information of uplink Resource Blocks, the ID of a user equipment (UE) terminal, the data size, the modulation scheme, uplink transmission power information, information of a Demodulation Reference Signal in an uplink MIMO and the like.

In a MIMO (Multi-Input Multi-Output) communication scheme, plural antennas are used to obtain faster data transmission rates and/or higher quality of the communications. Further, in the MIMO communication scheme, a transmission signal is copied and each of the signals is combined with an appropriate weighting coefficient and transmitted. By doing this, it becomes possible to transmit the signals as controlled beams having directionality. This method is called a Pre-coding method and the weighting factor (or weighting) used in this method is called a Pre-coding matrix.

FIG. 1 schematically shows a case where the Pre-coding is performed. As shown in FIG. 1, each of two (2) streams (Transmission signals 1 and 2) is copied to make two (2) signals so that the two (2) signals travel along two different systems (paths). In each system (path), the signal is multiplied by (combined with) the Pre-coding matrix, so that the combined signal is transmitted. From the viewpoint of utilizing more appropriate Pre-coding matrix (or a set of Pre-coding vectors), the Pre-coding is performed in a closed-loop system as shown in FIG. 1. When the closed loop is formed, the Pre-coding matrix (or a set of Pre-coding vectors) may be adaptively controlled to have more appropriate value based on the feedback of the Pre-coding matrix from the receiving side (user equipment (UE) terminal). In the Pre-coding method, each stream is spatially separately transmitted; therefore, a greater quality improvement with respect to each stream may be obtained.

Non-Patent Document 1: 3GPP TR 25.814 (V7.0.0), "Physical Layer Aspects for Evolved UTRA," June 2006

Non-Patent Document 2: 3GPP R1-070103, "Downlink L1/L2 Control Signaling Channel Structure: Coding"

DISCLOSURE OF INVENTION

Problems to be Solved by the Invention

To appropriately demodulate a shared data channel (shared channel) to which the Pre-coding is applied, it is required to accurately perform channel compensation for the shared data channel. In one method to correctly perform the channel compensation, a reference signal is provided to which a Pre-coding is applied in addition to the shared data channel to which the Pre-coding is applied. Probably, if such reference signal is provided, the channel estimation may be accurately performed. However, not a small number of resources are required to be provided to transmit the reference signal, which may increase the overhead. Therefore, from the viewpoint of improving the throughput across the system, this method may not be preferable.

To overcome the problem, it may be thought that there is provided a Common Reference Signal which is common to all the user equipment (UE) terminals so that the channel compensation be performed based on the Common Reference Signal. When this method is used, it is required that a data indicating which Pre-coding (matrix) is to be applied (used) to the shared data channel is transmitted to the user equipment (UE) terminal. In the following, for explanatory purposes, the data are called Pre-coding Matrix Indicator (PMI).

FIG. 2 schematically shows one method of transmitting the PMI. As shown in FIG. 2, in this method, along with the Physical Downlink Shared Channel (PDSCH) to which the Pre-coding is applied, the PMI indicating the Pre-coding matrix applied to the Physical Downlink Shared Channel (PDSCH) is always transmitted. In the case of FIG. 2, the PMI indicating the Pre-coding matrix is feedback from the user equipment (UE) terminal to the base station apparatus eNB (hereinafter may be referred to as "feedback PMI"). The base station apparatus eNB transmits the Physical Downlink Shared Channel (PDSCH) along with the PMI indicating the Pre-coding matrix designated (selected) by the user equipment (UE) terminal or another Pre-coding matrix. According to this method, it may become possible that the base station apparatus eNB is entitled to determine the PMI indicating the Pre-coding matrix which is most suitable in transmission status; and therefore, more effective use of downlink resources may be achieved. For example, in a case where downlink transmission may be sufficiently performed with only two (2) streams, even if the user equipment (UE) terminal transmits the PMI indicating the Pre-coding matrix using four (4) streams, the base station apparatus eNB may determine to use a Pre-coding matrix (a set of Pre-coding vectors) using two (2) streams without using the Pre-coding matrix using four (4) streams transmitted from the user equipment (UE) terminal. In this case, by communicating using the Pre-coding matrix determined by the base station apparatus eNB, it may become possible to adequately and effectively use the downlink resources. However, in this method, since the PMI is required to be always transmitted in downlink, the overhead may be increased accordingly. Further, data amounts occupied by the PMI may be increased or decreased depending on the number of multiplexed users (user equipment (UE) terminals) in downlink, which may make it difficult to perform blind detection.

FIG. 3 schematically shows another method of letting the user equipment (UE) terminal know the pre-coding matrix to be used in the transmission from the base station apparatus eNB. In this case, the base station apparatus eNB is forced to use the PMI feedback from the user equipment (UE) terminal to the base station apparatus eNB (feedback PMI). In this case, from the viewpoint of reducing the overhead, it may be preferable because it is not required to transmit the PMI along with the Physical Downlink Shared Channel (PDSCH). However, when this method is used, the base station apparatus eNB cannot replace the pre-coding matrix by one that is more suitable. Therefore, it may not be preferred from the viewpoint of effective use of the downlink resources. Further, if the base station apparatus eNB should fail to correctly recognize the feedback PMI, the base station apparatus eNB may perform Pre-coding using a Pre-coding matrix different from that assumed by the user equipment (UE) terminal. Further, in this case, since the user equipment (UE) terminal does not know that the base station apparatus eNB has failed to correctly recognize the feedback PMI, and the user equipment (UE) terminal may be forced to wastefully process the received signal having degraded quality.

According to an embodiment of the present invention, there may be provided a MIMO mobile communication system in which downlink overhead can be reduced and effective use of radio resources can be achieved.

Means for Solving the Problems

According to an aspect of the present invention, there is provided a base station apparatus capable of communicating with a user equipment terminal in a multi-input multi-output (MIMO) mobile communication system using Pre-coding. The base station apparatus includes a receiving unit receiving a Pre-coding Matrix Indicator (PMI) indicating a specific Pre-coding matrix, a determination unit determining a value of a flag indicator indicating whether the Pre-coding matrix specified in the PMI is to be used for downlink communications, a control signal generation unit generating a downlink control signal including at least the flag indicator, and a transmission unit transmitting a signal including the downlink control signal in downlink.

Advantageous Effect of the Invention

According to an embodiment of the present invention, there may be provided a MIMO mobile communication system in which downlink overhead can be reduced and effective use of radio resources can be achieved.

EXPLANATION OF REFERENCES

102: RF RECEIVER SECTION
104: UPLINK RECEIVING SIGNAL DEMODULATING SECTION
106: DATA SIGNAL DECODING SECTION
108: CONTROL BITS DECODING SECTION
110: PMI VALIDITY DETERMINATION SECTION
112: PRE-CODING MATRIX SELECTING SECTION
114: ERROR DETECTION BIT ADDITION SECTION
116: PMI REMOVING SECTION
118: CHANNEL-CODING SECTION
120: CONTROL BITS MODULATION SECTION
122: SERIAL-PARALLEL CONVERSION SECTION
124: CHANNEL-CODING SECTION
126: DATA MODULATION SECTION
128: PRE-CODING MATRIX MULTIPLYING SECTION
130: SIGNAL MULTIPLEXING SECTION
132: IFFT SECTION
134: RF TRANSMITTER SECTION
202: DATA SIGNAL CODING AND MODULATION SECTION
204: CONTROL SIGNAL CODING AND MODULATION SECTION
206: UPLINK TRANSMISSION SIGNAL GENERATION SECTION
208: RF TRANSMITTER SECTION
210: RF RECEIVER SECTION
212: FFT SECTION
214: PRE-CODING MATRIX SELECTING SECTION
216: PMI ACCUMULATION SECTION
218: DATA DEMODULATION SECTION
220: CHANNEL DECODING SECTION
222: PMI ADDING SECTION
224: ERROR DETECTION SECTION
230: PRE-CODING MATRIX MULTIPLYING SECTION
232: SIGNAL SEPARATION SECTION
234: CHANNEL DECODING SECTION
236: PARALLEL-SERIAL CONVERSION SECTION

BEST MODE FOR CARRYING OUT THE INVENTION

Figure 1:
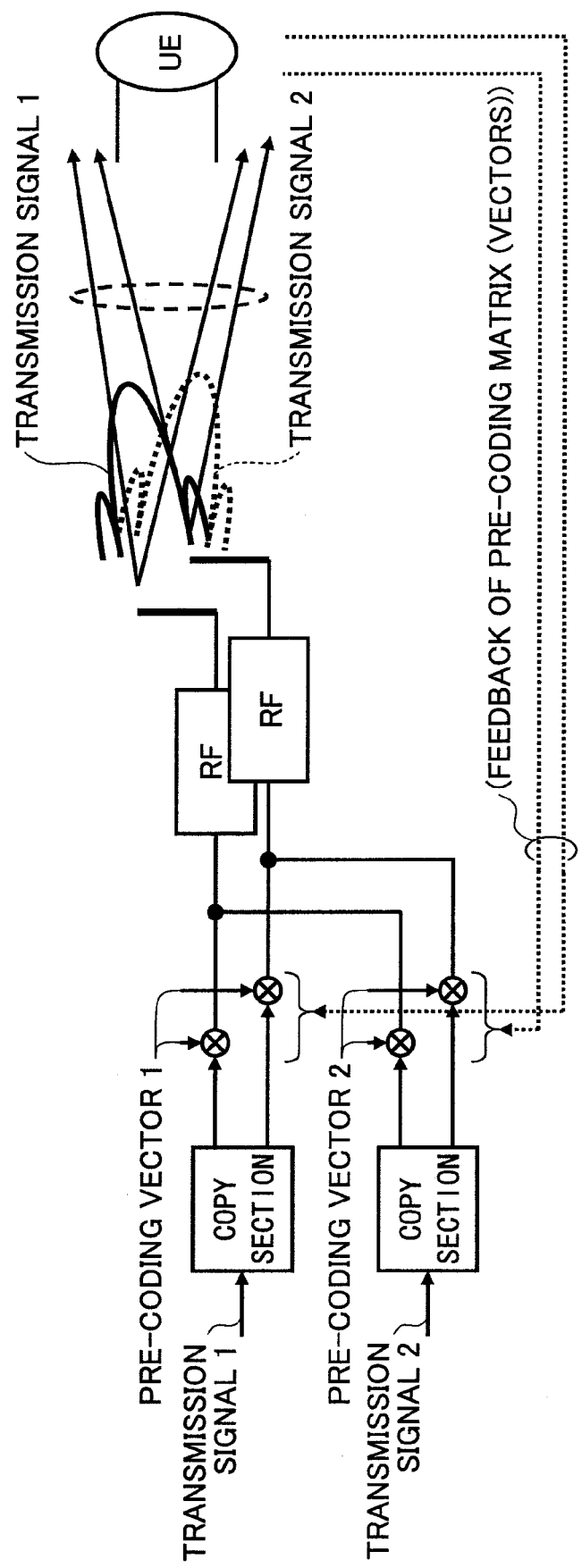
FIG. 1 is a schematic drawing showing a case where Pre-coding is performed.
Figure 2:
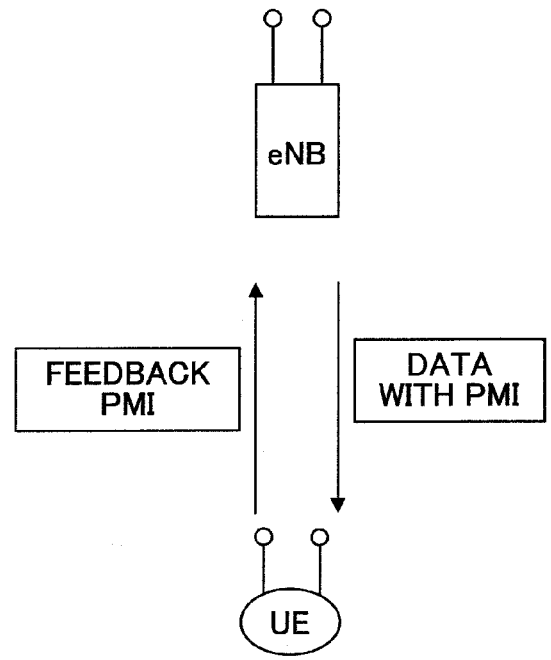
FIG. 2 is a schematic drawing showing a problem in a conventional method.
Figure 3:
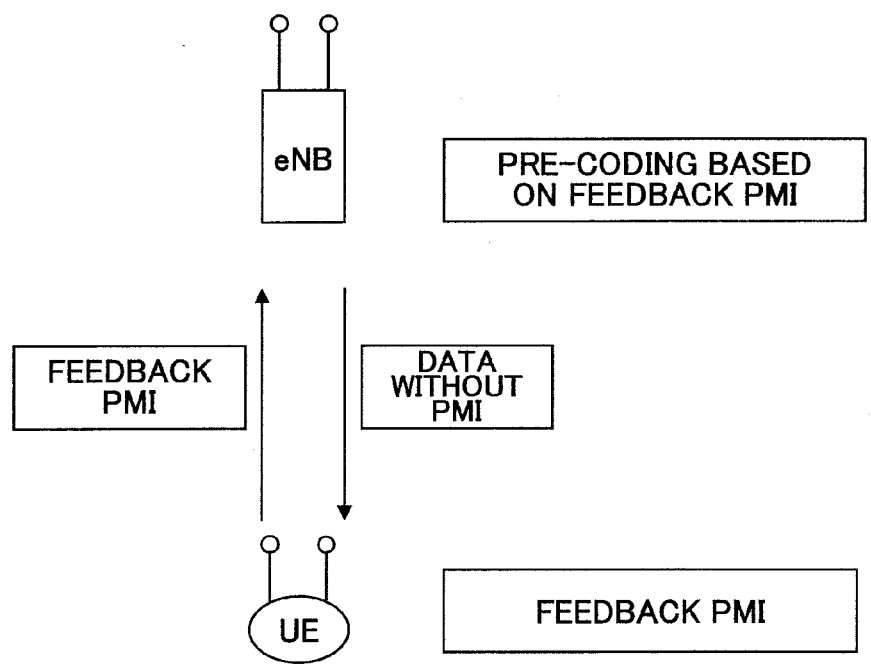
FIG. 3 is a schematic drawing showing a problem in another conventional method.
Figure 4:
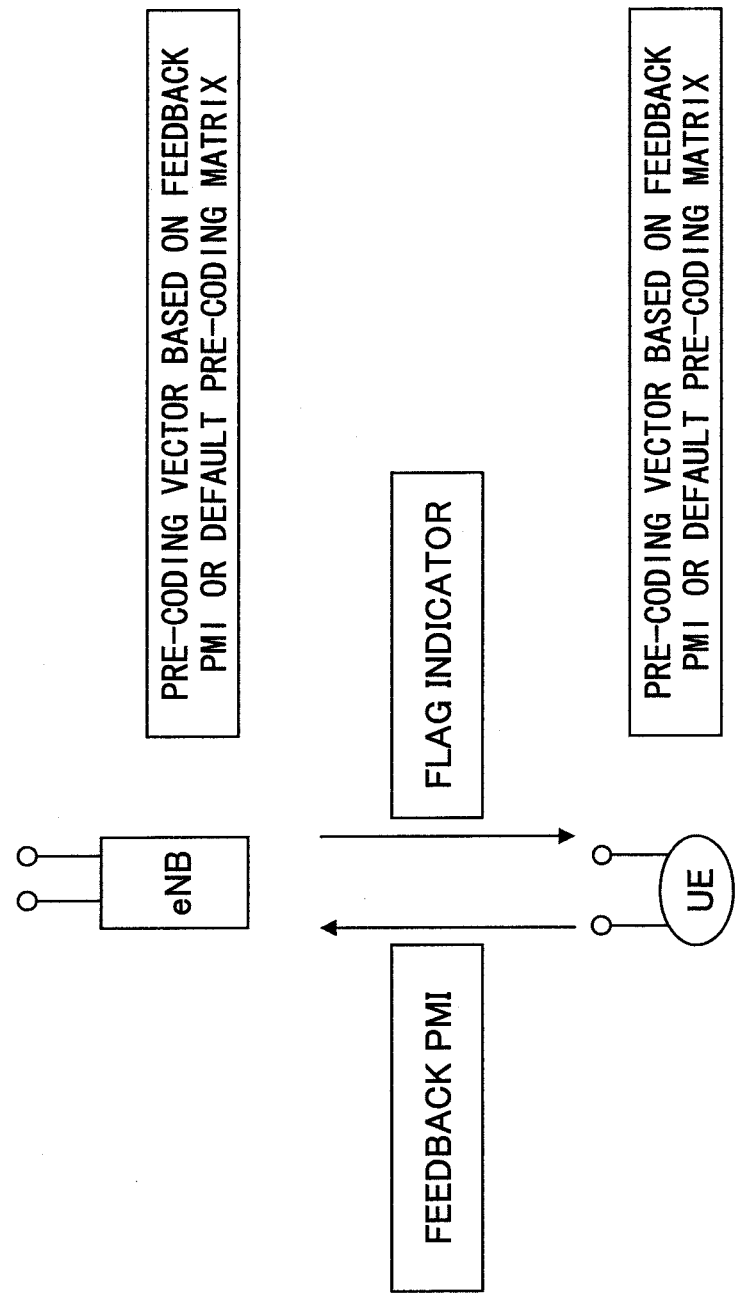
FIG. 4 is a schematic drawing showing where the Pre-coding is performed based on a method used between a base station apparatus eNB and a user equipment (UE) terminal according to an embodiment of the present invention.

FIG. 4 schematically shows communications between a base station apparatus eNB and a user equipment (UE) terminal according to an embodiment of the present invention. In the communications, first, a Pre-coding Matrix Indicator (PMI) indicating a specific Pre-coding matrix is feedback from the user equipment (UE) terminal to the base station apparatus eNB. The base station apparatus eNB determines whether the Pre-coding matrix specified in the PMI is to be actually used in downlink communications and provides a flag indicator indicating the determination result. Then, the base station apparatus eNB transmits a Physical Downlink Shared Channel (PDSCH) along with the provided flag indicator to the user equipment (UE) terminal. The user equipment (UE) terminal receives the flag indicator and determines whether the Pre-coding matrix which has been fed back to the base station apparatus eNB in the past is actually being used in downlink communications by checking the received flag indicator. For example, a value of the flag indicator may be expressed using one (1) bit. In this case, when the value of the bit is "0" (zero), the Pre-coding matrix specified in the PMI is used in the downlink communications. On the other hand, when the value of the bit is "1" (one), a default Pre-coding matrix already known to both the base station apparatus eNB and the user equipment (UE) terminal is used. Generally, the number of bits representing the flag indicator is less than the number of bits representing the PMI; therefore, overhead when using the flag indicator may be remarkably reduced compared with a case where the PMI is transmitted in each downlink transmission as in a conventional method. Further, the base station apparatus eNB may select an appropriate Pre-coding matrix different from the Pre-coding matrix specified in the PMI feedback from the user equipment (UE) terminal so as to effectively use downlink resources.

However, there may a case where the Pre-coding matrix used in the downlink communications by the base station apparatus eNB is different from the Pre-coding matrix determined by the user equipment (UE) terminal based on the received flag indicator from the base station apparatus eNB. This problem may occur when, for example, the base station apparatus eNB fails to receive a correct PMI and recognizes a wrong PMI; and as a result, a wrong Pre-coding matrix indicated by the wrong PMI is used as the Pre-coding matrix for the downlink transmissions, when the user equipment (UE) terminal fails to received a correct flag indicator and recognizes a wrong flag indicator or the like. In such cases, if the user equipment (UE) terminal performs a weighting process and the following processes on the received signal from the base station apparatus eNB using the Pre-coding matrix provided by the user equipment (UE) terminal, remarkably deteriorated signals may be wastefully derived (obtained). To avoid this problem, preferably, the user equipment (UE) terminal may determine whether a data transmitted from the base station apparatus eNB is correct.

According to an embodiment of the present invention, the base station apparatus eNB performs a channel-coding (coding) process by treating a data part as a unit of the coding, the data part including control bits, the flag indicator (bit(s)), and error detection bits. The error detection bits are derived (calculated) by performing a predetermined calculation on a calculation target including at least the control bits and the flag indicator (bit(s)). Further, when the flag indicator (bit(s)) is a predetermined value, the PMI is included in the calculation target; and on the other hand, when the flag indicator (bit(s)) is another predetermined value, the PMI is not included in the calculation target. On the other hand, the user equipment (UE) terminal also derives (calculates) the error detection bits by performing the predetermined calculation on the calculation target including the control bits, the flag indicator (bit(s)), and when necessary, the PMI. Then, the error detection bits provided (calculated) by the base station apparatus eNB are compared with the error detection bits provided (calculated) by the user equipment (UE) terminal. By doing this, it may become possible to determine whether the Pre-coding matrix provided by the user equipment (UE) terminal based on the flag indicator is actually being used in the downlink communications.

The number of bits of the flag indicator is less than that of the PMI; therefore, it may not be easy to obtain a sufficiently high error correction capability if only the flag indicator (bit(s)) is included in the calculation target for obtaining (calculating) the error detection bits. To avoid such problem, as described above, according to an embodiment of the present invention, not only the flag indicator (bit(s)) but also the control bits and the error detection bits are collectively coded. By doing this, it may become possible to obtain a larger coding gain when compared with a case where only the flag indicator (bit(s)) is coded.

The number of bits of the flag indicator is not limited to a specific number, but may be (1) as the minimum number.

When the Pre-coding matrix specified in the PMI is not to be used for the downlink communications, the default Pre-coding matrix already known to both the base station apparatus eNB and the user equipment (UE) terminal may be used as the Pre-coding matrix to be used for the downlink communications. When determining this, the default Pre-coding matrix is always used for the downlink communications when the Pre-coding matrix specified in the PMI is not actually used. Therefore, by checking the value of the flag indicator (bit(s)) having a smaller number of bits than that of the PMI, it may become possible to specify the Pre-coding matrix that is actually used for the downlink communications.

In a case where the value of the flag indicator (bit(s)) indicates that the default Pre-coding matrix is not used for the downlink transmission (hereinafter this case may be referred to a case when "X=0"), a data part including a data in which the PMI is convolved with the control bits, the flag indicator (bit(s)), and the error detection bits may be coded (channel-coded) and transmitted to the user equipment (UE) terminal. This may be preferable from the viewpoint of transmitting the PMI to the user equipment (UE) terminal without increasing the number of the control bits. However, in this case, it is required to separately transmit data indicating the number of bits occupied (convolved) with the PMI to the user equipment (UE) terminal.

According to an embodiment of the present invention, the base station apparatus eNB may perform an error detection process on the PMI which is feedback from the user equipment (UE) terminal (hereinafter may be referred to as "feedback PMI"). This process may be preferable from the viewpoint of reliably determining whether the default Pre-coding matrix is to be used for the downlink communications. Further, for example, the user equipment (UE) terminal receives both the PMI and the error detection bits of the PMI and performs an error detection process on the PMI based on a comparison between the error detection bits calculated by the user equipment (UE) terminal and the error detection bits calculated by the base station apparatus eNB. Further, the base station apparatus eNB may perform the error detection process based on a received quality level of an uplink reference signal received from the user equipment (UE) terminal. Further, the base station apparatus eNB may perform the error detection process based on likelihood data of a shared data channel received from the user equipment (UE) terminal.

In the following, an embodiment of the present invention is described with reference to the accompanying drawings. In the embodiment, some specific values may be used as examples. Such values, however, are for explanatory purposes only and, unless otherwise described, any other appropriate value may be used.

Embodiment 1

Operations Before Downlink Communication is Started

In the following, the operations of the base station apparatus eNB and the user equipment (UE) terminal in a mobile communication system according to an embodiment of the present invention is described. In the mobile communication system, it is assumed that while Pre-coding is performed, communications based on a MIMO (Multi-Input Multi-Output) scheme are performed. Therefore, both the base station apparatus eNB and the user equipment (UE) terminal have plural transmission/receiving antennas and weightings based on Pre-coding matrices are applied so that signals are transmitted in the appropriate directions from the antennas.

Figure 5:
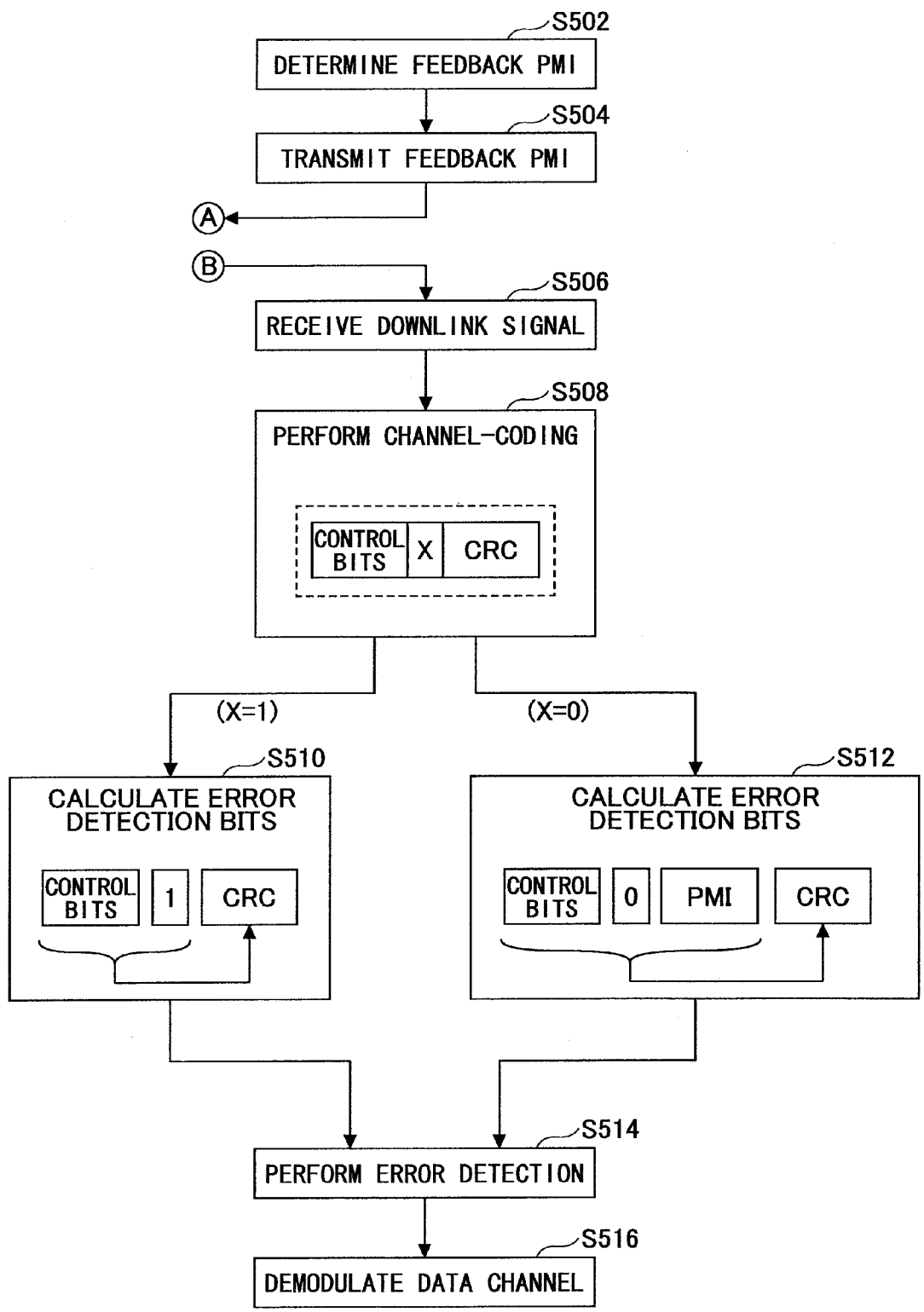
FIG. 5 is a flowchart showing an operational example of the user equipment (UE) terminal according to an embodiment of the present invention.
Figure 6:
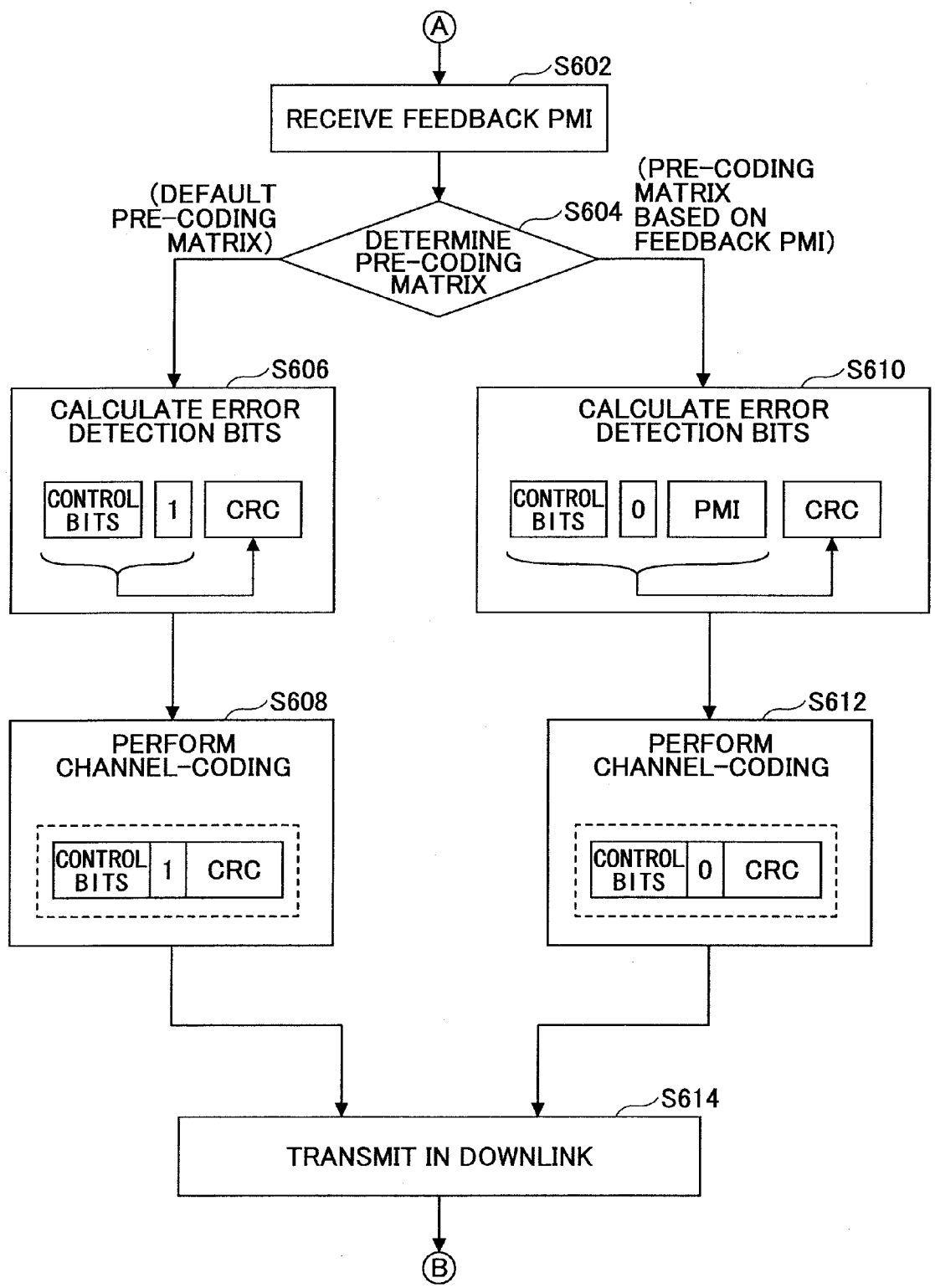
FIG. 6 is a flowchart showing an operational example of the base station apparatus eNB according to an embodiment of the present invention.

FIGS. 5 and 6 are flowcharts showing exemplary operations performed by the user equipment (UE) terminal and the base station apparatus eNB, respectively, according to an embodiment of the present invention. In the exemplary operations of FIGS. 5 and 6, selection of the Pre-coding matrix is adaptively controlled based on the PMI feedback from the user equipment (UE) terminal to the base station apparatus eNB (i.e., feedback PMI). As shown in FIG. 5, in step S502, the user equipment (UE) terminal determines the PMI to be feedback to the base station apparatus eNB (i.e., feedback PMI). Typically, the Pre-coding matrix specified in the PMI is one of a predetermined number of Pre-coding matrices ($U_1$, $U_2$, ..., $U_P$). Namely, the PMI specifies a Pre-coding matrix ($U_i$) of the Pre-coding matrices ($U_1$, $U_2$, ..., $U_P$). More generally, the Pre-coding matrices are not a group of choices and may be adaptively adjustable so that any appropriate Pre-coding matrix can be formed. However, it may be preferable if the Pre-coding matrices are provided so as to be selected from a group of choices from the viewpoints of reducing a calculation load for controlling the selection of the Pre-coding matrix and enabling the adaptive control.

Next, in step S504, the user equipment (UE) terminal transmits the determined PMI to the base station apparatus eNB.

Next, the process goes to step S602 shown in FIG. 6. In step S602, the base station apparatus eNB receives the PMI (feedback PMI) from the user equipment (UE) terminal.

In step S604, the base station apparatus eNB determines the Pre-coding matrix specified in the PMI and further determines whether the Pre-coding matrix specified in the PMI is suitable to be used for the downlink communications. In this case, the base station apparatus eNB may determine whether the Pre-coding matrix is suitable based on the number of streams, the number of transmission antennas, an amount of downlink traffic or the like. In this embodiment, when determining that the Pre-coding matrix specified in the PMI is not suitable to be used for the downlink communications, a default Pre-coding matrix already known to both the base station apparatus eNB and the user equipment (UE) terminal is selected as the Pre-coding matrix to be used for the downlink communications. More than one default Pre-coding matrix may be provided; however, for simplification purposes, herein it is assumed that there is provided only one default Pre-coding matrix. Namely, in this embodiment, there are two choices provided for selecting the Pre-coding matrix; i.e., one choice is to select the Pre-coding matrix specified in the PMI, and the other choice is to select the default Pre-coding matrix. Further, in this embodiment, the flag indicator is defined using one (1) bit to determine which of the Pre-coding matrices is to be selected as the Pre-coding matrix to be used for the downlink communications. Therefore, in this case, depending on the value of the flag indicator bit (for example, whether the value is "1" or "0"), the default Pre-coding matrix or the Pre-coding matrix specified in the PMI is selected to be used. When more than one default Pre-coding matrix are provided, more than one flag indicator bits may be used to express the necessary number of values of the flag indicator. In this case, for example, when three (3) types of default Pre-coding matrices are provided, two (2) bits of flag indicator may be used to transmit data indicating which type of the Pre-coding matrix is to be used for the downlink communications.

In step S604, when determining that the default Pre-coding matrix is selected as the Pre-coding matrix to be used for downlink communications, the process goes to step S606. In step S606, the error rate bits are calculated assuming that the default Pre-coding matrix is to be used for downlink communications.

Figure 7:
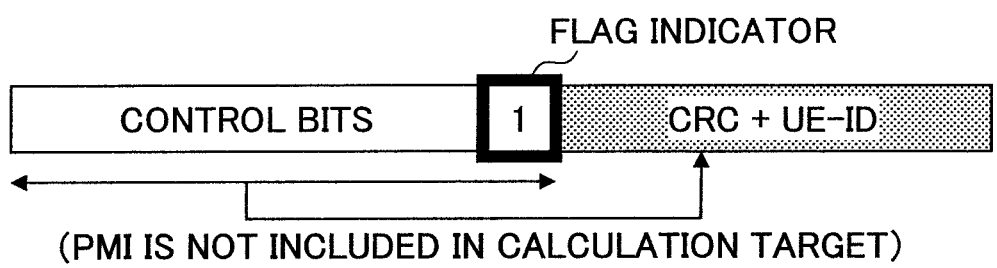
FIG. 7 is a drawing showing where error detection bits are calculated when a value of flag indicator is one (1)

FIG. 7 schematically shows how the error detection bits are derived (calculated) when the default Pre-coding matrix is to be used for downlink communications. As shown in FIG. 7, the error detection bits are derived (calculated) by performing a predetermined calculation on data bits (calculation target) including the control bits (control data) and the value of the flag indicator bit (a value of "1" in this example of FIG. 7). Typically, as the error detection bits, the detection bits being used for the CRC (Cyclic Redundancy Check) (i.e., CRC error detection bits) may be used. Alternatively, any other appropriate detection bits may be used. In this embodiment, as shown in FIG. 7, a user identifier (UE-ID) is convolved with the error detection bits being used for error detection (CRC). Further, the control bits include various information items to be transmitted to the user equipment (UE) terminal in downlink communications. The information items typically include data included in an L1/L2 control channel (L1/L2 CCH); however, alternatively, the information items may include only a part of the data included in an L1/L2 control channel (L1/L2 CCH) or data other than the data included in an L1/L2 control channel (L1/L2 CCH). In any case, in step S606, the control bits as a part of the calculation target of the error detection bits include any data other than the flag indicator and the PMI.

Next, in step S608 of FIG. 6, a coding (channel-coding) process for error correction is performed. As the method of the coding, any appropriate known coding method in this technical field may be used including convolutional coding, turbo coding or the like. In this step of this embodiment, the coding is performed by treating the data bits (data part) including the control bits, the flag indicator bit (indicating a value of "1"), and the error detection bits as a unit of the coding.

On the other hand, in step S604, when determining that the Pre-coding matrix specified in the PMI is selected as the Pre-coding matrix to be used for downlink communications, the process goes to step S610. In step S610, the error rate bits are calculated assuming that the Pre-coding matrix specified in the PMI is to be used for downlink communications.

Figure 8:
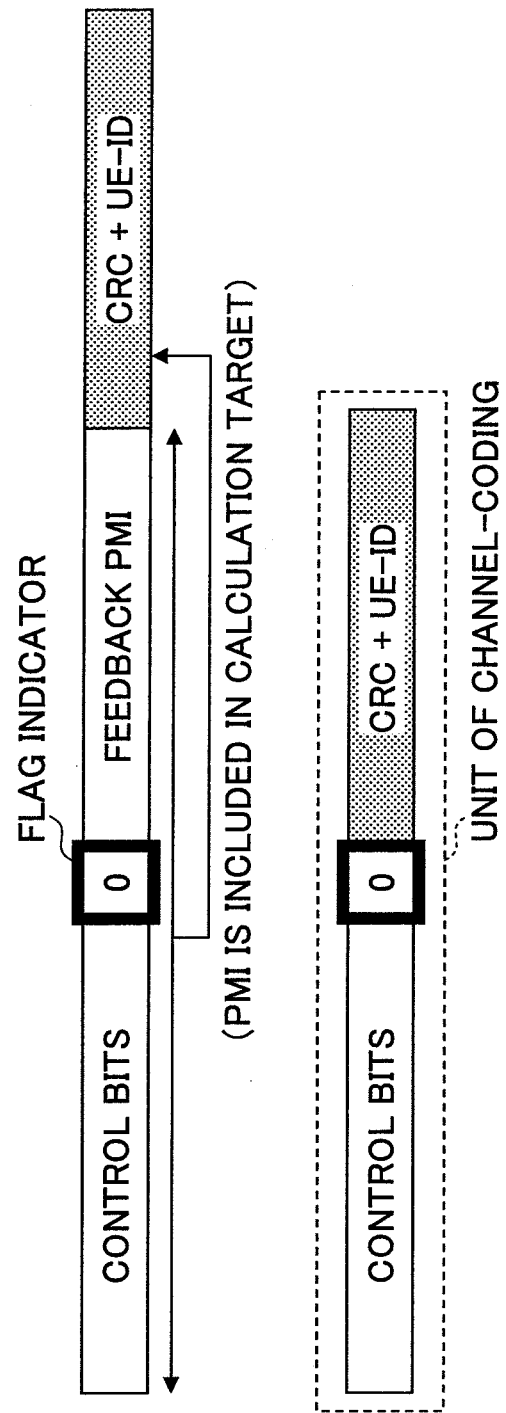
FIG. 8 is a drawing showing where the error detection bits are calculated and a unit of channel encoding when the value of the flag indicator is zero (0)

FIG. 8 schematically shows how the error detection bits are derived (calculated) when the Pre-coding matrix specified in the PMI is to be used for downlink communications. As shown in FIG. 8, the error detection bits are derived (calculated) by performing the predetermined calculation on the data bits (calculation target) including the control bits (control data), the value of the flag indicator bit (a value of "0" in this example of FIG. 8), and the PMI feedback from the user equipment (UE) terminal (i.e., feedback PMI). Typically, as the error detection bits, the detection bits being used for the CRC (Cyclic Redundancy Check) may be used. Alternatively, any other appropriate detection bits may be used. In this embodiment, as shown in FIG. 8, a user identifier (UE-ID) is convolved with the error detection bits being used for error detection (CRC). Unlike the case of FIG. 7, as shown in FIG. 8, it should be noted that the feedback PMI is included in the calculation target used for deriving (calculating) the error detection bits. As described above, the control bits include various information items to be transmitted to the user equipment (UE) terminal in downlink communications. The information items typically include data included in an L1/L2 control channel (L1/L2 CCH); however, alternatively, the information items may include only a part of the data included in an L1/L2 control channel (L1/L2 CCH) or data other than the data included in an L1/L2 control channel (L1/L2 CCH).

Next, in step S612 of FIG. 6, a coding (channel-coding) process for error correction is performed. As the method of the coding, any appropriate known coding method in this technical field may be used including convolutional coding, turbo coding or the like. In this step of this embodiment, the coding is performed by treating the data bits (data part) including the control bits, the flag indicator bit (indicating a value of "0"), and the error detection bits as a unit of the coding.

In this step S612, as shown in FIG. 8, the feedback PMI is not included in the unit of the coding. Namely, as a result, the feedback PMI is included in the calculation target used for deriving (calculating) the error detection bits but is not included in a target to be coded (channel-coded). In addition, in the coding process in steps S608 and S610, the data bits (data part) including the control bits, the flag indicator bit, and the error detection bits are treated as a unit of the coding; therefore, the coded data coded in steps S608 and S610, respectively, become to have substantially the same size.

In step S614 of FIG. 6, a signal including the coded (channel-coded) data part is adequately transmitted in downlink. In the flowchart of FIG. 6, generic processes for signal processing to generate a downlink transmission signal are herein omitted for simplification purposes. In this case, the transmission signal may include signals such as the Physical Downlink Shared Channel (PDSCH) and a reference signal in addition to the Physical Downlink Control Channel (PDCCH). The signal processing may include, for example, data modulation (such as QPSK and 16 QAM), weighting for Pre-coding, IFFT (Inverse Fast Fourier Transform) conversion, addition of a guard interval, digital-to-analog conversion, band-limiting, power amplification and the like.

Further, in step S602, the base station apparatus eNB may further determine whether the received feedback PMI is correct. In this case, for example, in receiving not only the feedback PMI but also error detection bits of the feedback PMI from the user equipment (UE) terminal, the base station apparatus eNB may determine whether the received feedback PMI is correct based on the received error detection bits. Further, the base station apparatus eNB may determine whether the received feedback PMI is correct based on received quality information (e.g. received SINR) of a received uplink reference signal from the user equipment (UE) terminal. Further, upon receiving an uplink shared channel (UL-SCH), the base station apparatus eNB may determine whether the received feedback PMI is correct based on likelihood data obtained as a decoding result of the received uplink shared channel (UL-SCH). Further, the base station apparatus eNB may determine whether the received feedback PMI is correct based on likelihood data obtained as a decoding result of the received feedback PMI itself. These methods may be used separately or in combination thereof.

Figure 9:
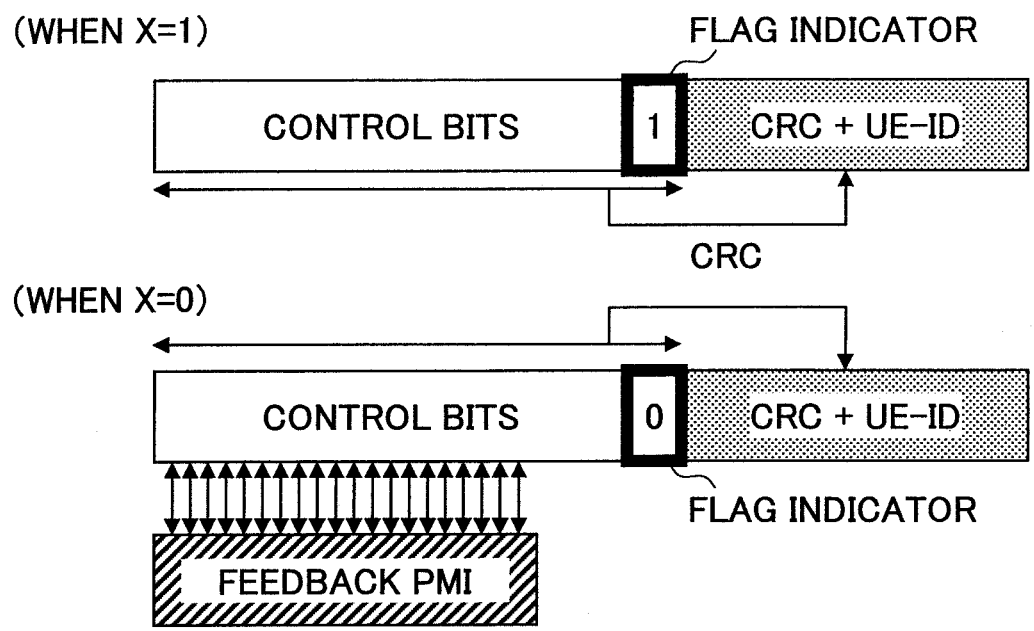
FIG. 9 is a drawing showing cases where error detection bits are calculated, including a case where a feedback PMI (Pre-coding Matrix Indicator) is convolved with control bits.

Further, as shown in FIG. 9, before the coding (channel-coding) process of step S612 is performed, the data indicating the PMI (feedback PMI) may be convolved with the control bits. By doing this, when the data indicating the PMI (feedback PMI) are transmitted in downlink, it is not necessary to increase the number of bits of the signals. However, it is necessary to transmit data indicating which bits of the control bits are used for convolving the feedback PMI with the control bits to the user equipment (UE) terminal by any method.

Operations After Downlink Communication is Started

Referring back to FIG. 5, in step S506, the user equipment (UE) terminal receives the Physical Downlink Shared Channel (PDSCH) (downlink transmission) from the base station apparatus eNB. In the flowchart of FIG. 5, generic processes for signal processing to provide a downlink transmission signal are omitted for simplification purposes. In this case, the received signal may include signals such as the Physical Downlink Shared Channel (PDSCH) and a reference signal in addition to the Physical Downlink Control Channel (PDCCH). The signal processing may include, for example, power amplification, band-limiting, analog-to-digital conversion, removal of the guard interval, FFT (Fast Fourier Transform) conversion and the like.

Next, in step S508, the data bits (data part) received in the Physical Downlink Shared Channel (PDSCH) (received signal) in step S506 are decoded (channel-decoded). As described in step S608 and S610 of FIG. 6, the data bits (data part) including the control bits, the flag indicator bit, and the error detection bits are treated as a unit of the coding. After the decoding (channel-decoding), a value "X" of the flag indicator bit is checked (obtained). When determining that X=1, the process goes to step S510; and on the other hand, when determining that X=0, the process goes to step S512.

In step S510, the error detection bits when X=1 are calculated. When the process goes to this step S510, it is in a case where the default Pre-coding matrix is selected as the Pre-coding matrix to be used for the downlink communications. Therefore, in the base station apparatus eNB, the error detection bits are derived (calculated) in step S606 of FIG. 6 as shown in FIG. 7. Therefore, in this step S510 as well, the error detection bits are derived (calculated) by performing the predetermined calculation on the data bits (calculation target) including the control bits (control data) and the value of the flag indicator bit (a value of "1").

On the other hand, in step S512, the error detection bits when X=0 is calculated. When the process goes to this step S512, it is in a case where the Pre-coding matrix specified in the PMI is selected as the Pre-coding matrix to be used for the downlink communications. Therefore, in the base station apparatus eNB, the error detection bits are derived (calculated) in step S610 of FIG. 6 as shown in FIG. 8. Therefore, in this step S512 as well, the error detection bits are derived (calculated) by performing the predetermined calculation on the data bits (calculation target) including the control bits (control data), the value of the flag indicator bit (a value of "0"), and the PMI feedback from the user equipment (UE) terminal (i.e., feedback PMI). The feedback PMI is the same as the feedback PMI that has been transmitted from the user equipment (UE) terminal to the base station apparatus eNB in step S504. Therefore, the feedback PMI is already known to the user equipment (UE) terminal when, for example, the feedback PMI is stored in a buffer of the user equipment (UE) terminal.

Next, in step S514, the user equipment (UE) terminal compares the error detection bits derived (calculated) in the base station apparatus eNB with the error detection bits derived (calculated) in the user equipment (UE) terminal for error detection. In the error detection comparison, when determining that the error detection bits derived (calculated) in the base station apparatus eNB are equal to the error detection bits derived (calculated) in the user equipment (UE) terminal, the user equipment (UE) terminal may correctly determine that the Pre-coding matrix used for the downlink communications is the default Pre-coding matrix or the Pre-coding matrix specified in the PMI.

Next, in step S516, based on the correct Pre-coding matrix confirmed in step S514, the channel compensation and the demodulation of the Physical Downlink Shared Channel (PDSCH) may be accurately performed.

According to this embodiment of the present invention, when the base station apparatus eNB fails to receive a correct PMI or when the user equipment (UE) terminal fails to receive correct data (signal) from the base station apparatus eNB, the user equipment terminal may obtain a negative result in the error detection comparison process (in step S514). Based on the result of the error detection comparison, the user equipment (UE) terminal may immediately discard the received data regarding the incorrect Pre-coding matrix or keep the received data having a lower likelihood level for preparing the following packet combining. According to this embodiment of the present invention, it may become possible to detect a difference of recognition concerning the Pre-coding matrix to be used for the downlink communication between the base station apparatus eNB and the user equipment (UE) terminal.

Configuration of Base Station Apparatus eNB

Figure 10:
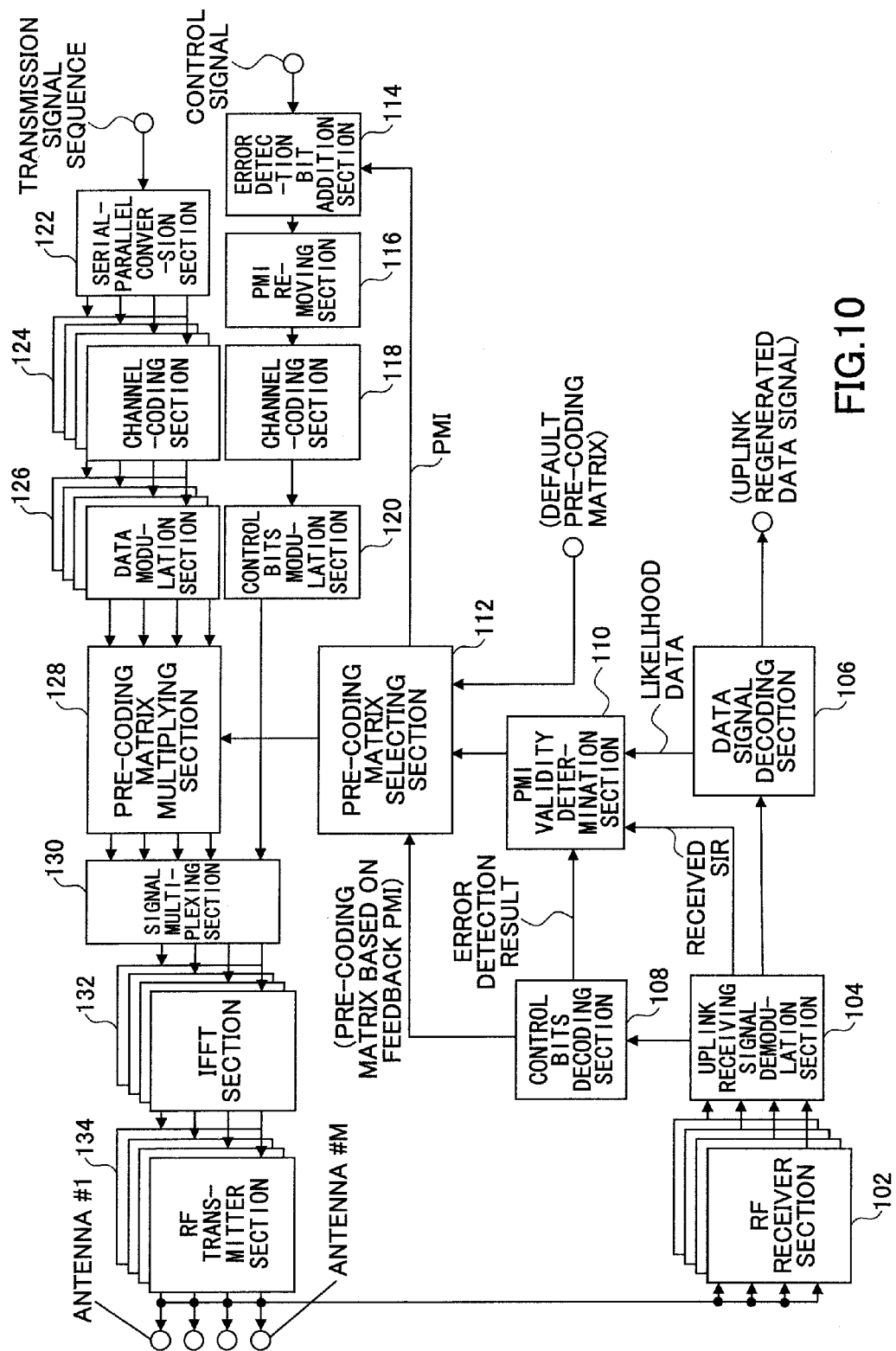
FIG. 10 is a functional block diagram showing an exemplary configuration of the base station apparatus eNB according to an embodiment of the present invention.

FIG. 10 is a functional block diagram of the base station apparatus eNB according to an embodiment of the present invention. As shown in FIG. 10, the base station apparatus eNB includes an RF receiver section 102, an uplink receiving signal demodulating section 104, a data signal decoding section 106, a control bits decoding section 108, a PMI validity determination section 110, a Pre-coding matrix selecting section 112, an error detection bit addition section 114, a PMI removing section 116, a channel-coding section 118, a control bits modulation section 120, a serial-parallel conversion section 122, a channel-coding section 124, a data modulation section 126, a Pre-coding matrix multiplying section 128, a signal multiplexing section 130, an IFFT section 132, and an RF transmitter section 134.

The RF receiver section 102 performs signal processing so as to convert the signals received by plural antennas #1 through #M into baseband digital signals. The signal processing may include, for example, power amplification, band-limiting, analog-to-digital conversion and the like.

The uplink receiving signal demodulating section 104 adequately separates received signals transmitted in uplink communications, the signals including a Physical Uplink Shared Channel (PUSCH), control channel (such as the L1/L2 control channel (L1/L2 CCH)), a reference signal and the like. Further, the uplink receiving signal demodulating section 104 performs channel estimation, received signal quality measurement and the like. As the received signal quality measurement, for example, SINR (Signal-to-Interference and Noise power Ratio) measurement may be performed.

The data signal decoding section 106 separates a received signal transmitted through transmission antennas into one or more streams and decodes each stream. The decoding is performed corresponding to the coding performed in the transmitting side. In the decoding, the likelihood data are obtained and the error correction is performed.

The control bits decoding section 108 decodes the control channel and extracts the data included in the L1/L2 control channel (L1/L2 CCH). According to an embodiment of the present invention, the control bits decoding section 108 extracts the PMI and specifies the Pre-coding matrix transmitted from the user equipment (UE) terminal. When receiving not only the PMI (feedback PMI) but also the error detection bits (typically CRC error detection bits) of the PMI, the control bits decoding section 108 may perform an error detection process on the PMI and output a result of the error detection.

The PMI validity determination section 110 determines whether the PMI feedback from the user equipment (UE) terminal (i.e., feedback PMI) is correct. To that end, when receiving not only the PMI (feedback PMI) but also the error detection bits of the PMI, the PMI validity determination section 110 may determine whether the feedback PMI is correct by using the error detection bits. Further, the PMI validity determination section 110 may determine whether the feedback PMI is correct based on the received quality information (e.g. received SINR) of the received uplink reference signal from the user equipment (UE) terminal. Further, the PMI validity determination section 110 may determine whether the feedback PMI is correct based on the likelihood data obtained when the received uplink shared channel (UL-SCH) is decoded. Further, the PMI validity determination section 110 may determine whether the feedback PMI is correct based on the likelihood data obtained as a decoding result of the received feedback PMI itself. FIG. 10 depicts that all of the error detection bits, the received quality information, and the likelihood data described above are provided. However, only one of the error detection bits, the received quality information, and the likelihood data or any combination of them may be used.

The Pre-coding matrix selecting section 112 selects (determines) the Pre-coding matrix to be used for the downlink communications based on the determination result of the PMI validity determination section 110 and a predetermined criterion (item) such as the necessary number of streams for downlink communications, the number of transmission antennas, an amount of downlink traffic or the like. For example, when the feedback PMI is correctly received, the Pre-coding matrix specified in the PMI may be used as the Pre-coding matrix to be used for the downlink communications. On the other hand, if the feedback PMI is incorrectly received, the use of the Pre-coding matrix specified in the PMI may become impractical. In this case, the default Pre-coding matrix already known to both the base station apparatus eNB and the user equipment (UE) terminal may be used. Further, even when the feedback PMI is correctly received, based on the actually required amount of downlink traffic, any Pre-coding matrix other than that specified in the PMI may be used. Further, the Pre-coding matrix selecting section 112 provides (generates) the flag indicator indicating, for example, whether the Pre-coding matrix specified in the PMI (feedback PMI) is selected as the Pre-coding matrix to be used for downlink communications (X=0) or the default Pre-coding matrix is selected as the Pre-coding matrix to be used for the downlink communications (X=1) and transmits the generated flag indicator to the error detection bit addition section 114. When X=0, the feedback PMI is also transmitted to the error detection bit addition section 114.

The error detection bit addition section 114 derives (calculates) the error detection bits (typically CRC error detection bits) by performing a predetermined calculation on the data bits (data part) including the control bits (control data), the flag indicator bit (e.g., indicating a value of "0" or "1"), and, when necessary, the feedback PMI.

The PMI removing section 116 removes the feedback PMI when the feedback PMI is included in the calculation target used for deriving (calculating) the error detection bits and, regardless of the value of the flag indicator, provides the data part including control bits, the flag indicator (bit(s)), and error detection bits.

The channel-coding section 118 performs the channel coding process by treating the data part as a unit of the channel-coding (coding) to generate a channel-coded signal.

The control bits modulation section 120 performs the data modulation on the channel-coded signal.

The serial-parallel conversion section 122 converts a serial transmission signal to be transmitted by using the Physical Downlink Shared Channel (PDSCH) into plural parallel streams.

The channel-coding section 124 performs the channel-coding process on each of the streams to generate channel-coded streams.

The data modulation section 126 performs the data modulation on the channel-coded streams.

The Pre-coding matrix multiplying section 128 performs the weighting based on the Pre-coding matrix on each of the streams, the Pre-coding matrix being selected (determined) by the Pre-coding matrix selecting section 112.

The signal multiplexing section 130 multiplexes the control channel, the Physical Downlink Shared Channel (PDSCH), and other channels.

The IFFT section 132 performs the inverse fast Fourier transform on each of the multiplexed streams for OFDM modulation.

The RF transmitter section 134 performs processes for wirelessly transmitting the streams using plural transmission antennas. The processes may include the addition of guard intervals, the digital-to-analog conversion, the band-limiting, the power amplification and the like.

Configuration of User Equipment (UE) Terminal

Figure 11:
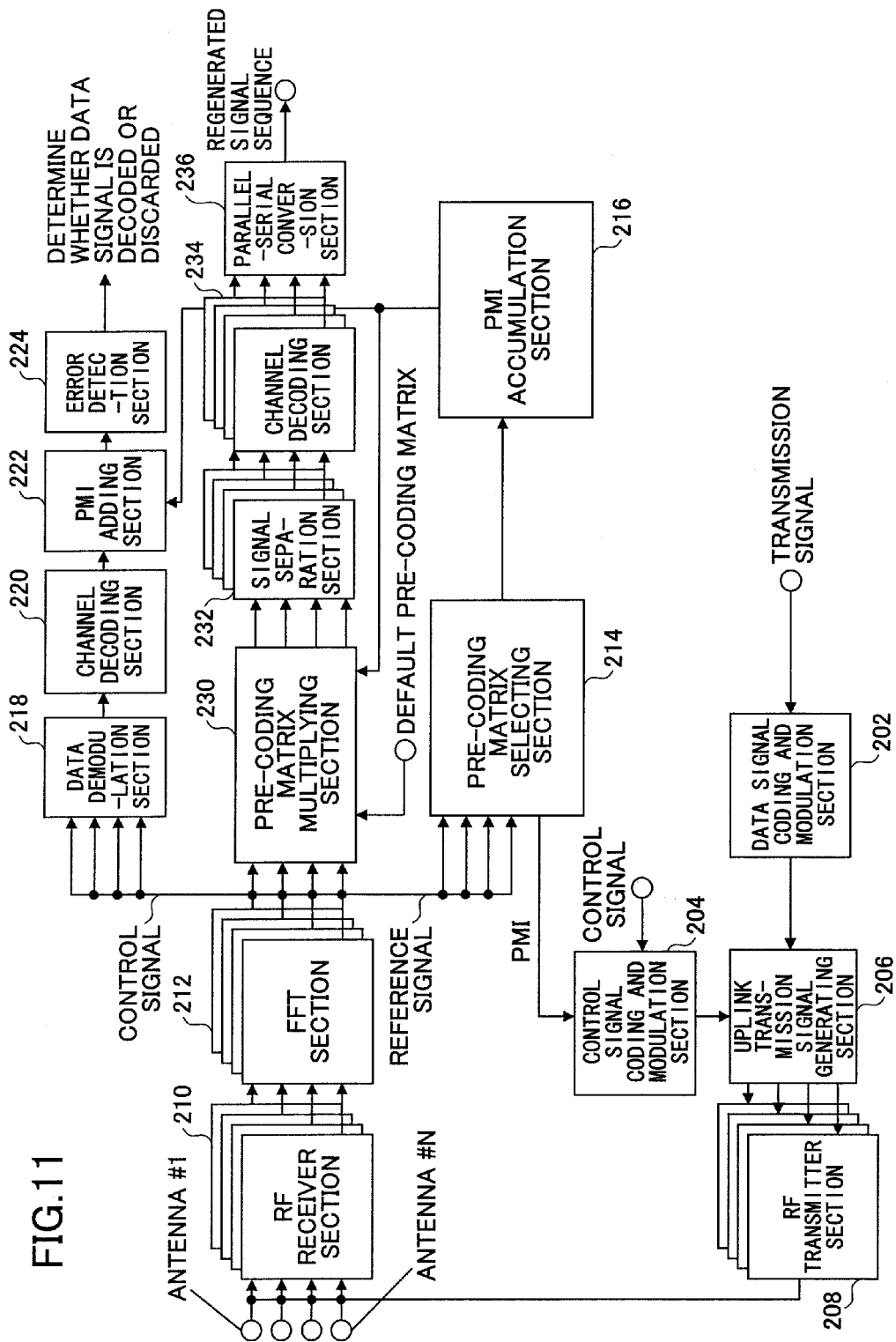
FIG. 11 is a functional block diagram showing an exemplary configuration of the user equipment (UE) terminal according to an embodiment of the present invention.

FIG. 11 is a functional block diagram of the user equipment (UE) terminal according to an embodiment of the present invention. As shown in FIG. 11, the user equipment (UE) terminal includes a data signal coding and modulation section 202, a control signal coding and modulation section 204, an uplink transmission signal generation section 206, an RF transmitter section 208, an RF receiver section 210, an FFT section 212, a Pre-coding matrix selecting section 214, a PMI accumulation section 216, a data demodulation section 218, a channel decoding section 220, a PMI adding section 222, an error detection section 224, a Pre-coding matrix multiplying section 230, a signal separation section 232, a channel decoding section 234, and a parallel-serial conversion section 236.

The data signal coding and modulation section 202 performs channel-coding and data modulation on the Physical Uplink Shared Channel (PUSCH).

The control signal coding and modulation section 204 performs channel-coding and data modulation on an Uplink L1/L2 Control Channel (UL L1/L2 Control Channel).

The uplink transmission signal generation section 206 adequately performs mapping of the control channel and the shared channel to provide (output) transmission streams. In this case, for example, some processes such as a DFT (Discrete Fourier Transform) process, a mapping process in frequency domain, and the IFFT process are performed on each of the streams.

The RF transmitter section 208 performs processes of converting the streams (in baseband) into a signal to be wirelessly transmitted using plural transmission antennas. The processes may include digital-to-analog conversion, band-limiting, power amplification and the like.

The RF receiver section 210, contrary to the RF transmitter section 208, performs processes of converting the signals wirelessly received by plural receiving antennas into streams in baseband. The processes may include power amplification, band-limiting, analog-to-digital conversion and the like with respect to each of the stream.

The FFT section 212 performs the fast Fourier transform on each of the stream for OFDM demodulation.

The Pre-coding matrix selecting section 214 selects the Pre-coding matrix suitable for the downlink communications based on the received quality level of the reference signal in the received signal from the base station apparatus eNB and outputs the PMI indicating the selected Pre-coding matrix. Typically, the Pre-coding matrix is one of the predetermined number of Pre-coding matrices ($U_1, U_2, \ldots, U_P$). Namely, the PMI specifies the Pre-coding matrix ($U_1$) of the Pre-coding matrices ($U_1, U_2, \ldots, U_P$). More generally, the Pre-coding matrices are not a group of choices and may be adaptively adjustable to so that any appropriate Pre-coding matrix can be formed.

The PMI accumulation section 216 stores the PMI for a certain period, the PMI being determined by the Pre-coding matrix selecting section 214.

The data demodulation section 218 demodulates the data part in the received signal.

The channel decoding section 220 performs the channel-decoding (decoding) process by treating the data part as a unit of the channel-decoding, the data part including the control bits, the flag indicator (bit(s)), and error detection bits (typically CRC detection bits). The unit of the channel-decoding corresponds to the unit of the coding performed in the transmitting side. As a result of the channel-decoding (decoding), the value of "X" of the flag indicator is determined.

When the value of the flag indicator is a predetermined value (in the above example, when X=0), from the PMI accumulation section 216, the PMI adding section 222 extracts the PMI for the calculation of the error detection bits, the PMI being transmitted to the base station apparatus eNB before. In this case, the error detection bits (typically CRC error detection bits) may be derived (calculated) by performing a predetermined calculation on the data bits (data part) including the control bits (control data), the flag indicator bit (indicating a value of "0"), and the provided PMI. On the other hand, when the value of the flag indicator has another value (in the above case, X=1), the error detection bits are derived (calculated) without providing (using) any PMI. Namely, the error detection bits (typically CRC error detection bits) may be derived (calculated) by performing the predetermined calculation on the data bits (data part) including the control bits (control data) and the flag indicator bit (indicating a value of "1").

The error detection section 224 compares the error detection bits provided (calculated) in the base station apparatus eNB with the error detection bits provided (calculated) by the user equipment (UE) terminal (PMI adding section 222) to determine whether data transmitted from the base station apparatus eNB are correct (whether any error is detected). When no error is detected, the following processes may be performed based on the data from the base station apparatus eNB. On the other hand, when an error is detected, the data from the base station apparatus eNB may be discarded or kept for preparing the following packet combining.

The Pre-coding matrix multiplying section 230 performs the weighting process using the Pre-coding matrix on the received Physical Downlink Shared Channel (PDSCH). This Pre-coding matrix may be the Pre-coding matrix previously feedback from the user equipment (UE) terminal to the base station apparatus eNB or the Pre-coding matrix determined as the default Pre-coding matrix, which depends on a result of the determination of the error detection section 224.

The signal separation section 232 separates the received signal into streams using any of the signal separation algorithms already known in the art.

The channel decoding section 234 performs the channel-decoding (decoding) on the received Physical Downlink Shared Channel (PDSCH).

The parallel-serial conversion section 236 converts plural parallel streams into a serial signal sequence and outputs the converted signal sequence which is equal to the signal sequence provided in the base station apparatus eNB before being wirelessly transmitted.

The present invention is described above by referring to a specific embodiment. However, a person skilled in the art may understand that the above embodiments are described for illustrative purpose only and may think of examples of various modifications, transformations, alterations, changes and the like. To promote an understanding of the present invention, the specific values are used as examples throughout the description. However, it should be noted that such specific values are just sample values unless otherwise described, and any other values may be used. For illustrative purposes, the apparatus according to an embodiment of the present invention is described with reference to the functional block diagram. However, such an apparatus may be provided by hardware, software, or a combination thereof. The present invention is not limited to the embodiments described above and various modifications, transformations, alteration, exchanges and the like may be made without departing from the scope and spirit of the present invention.

The present application is based on and claims the benefit of priority of Japanese Patent Application No. 2007-161942, filed on Jun. 19, 2007, and the entire contents of Japanese Patent Application No. 2007-161942 are hereby incorporated herein by reference.

The invention claimed is:

1. A base station apparatus capable of communicating with a user equipment terminal in a multi-input multi-output (MIMO) mobile communication system using Pre-coding, the base station apparatus comprising:
a receiving unit configured to receive a Pre-coding Matrix Indicator (PMI) indicating a specific Pre-coding matrix;
a determination unit configured to determine a value of a flag indicator indicating whether the Pre-coding matrix specified in the PMI is to be used for downlink communications;
a control signal generation unit configured to generate a downlink control signal including at least the flag indicator; and
a transmission unit configured to transmit a signal including the downlink control signal in downlink,
wherein the control signal generation unit is configured to derive error detection information by performing a predetermined calculation on a calculation target including at least control information and the flag indicator, and
wherein the control signal generation unit is configured to perform a channel-coding process on a data part including the control information, the flag indicator, and the error detection information by treating the data part as a unit of the channel-coding.

2. The base station apparatus according to claim 1, wherein when the determination unit determines that the Pre-coding matrix specified in the PMI is not to be used for downlink communications, a default Pre-coding matrix already known to both the base station apparatus and the user equipment terminal is selected as the Pre-coding matrix to be used for the downlink communications.

3. The base station apparatus according to claim 1, wherein the flag indicator is expressed using one bit.

4. The base station apparatus according to claim 1, wherein the flag indicator is expressed using more than one bit so as to select any of plural default Pre-coding matrices.

5. The base station apparatus according to claim 1, wherein when the value of the flag indicator is a predetermined value, the control signal generation unit performs the channel-coding process on the data part including the control information with which the PMI is convolved, the flag indicator, and the error detection information by treating the data part as a unit of the channel-coding.

6. The base station apparatus according to claim 1, further comprising:
an error detection unit configured to perform an error detection process on the PMI.

7. The base station apparatus according to claim 6, wherein the receiving unit receives the PMI and error detection information of the PMI, and the error detection unit performs the error detection process by comparing the error detection information calculated in the user equipment terminal and the error detection information calculated in the base station apparatus.

8. The base station apparatus according to claim 6, wherein the error detection unit performs the error detection process based on a received quality level of an uplink reference signal received from the user equipment terminal.

9. The base station apparatus according to claim 6, wherein the error detection unit performs the error detection process based on likelihood information of a shared data channel received from the user equipment terminal.

10. A communication control method to be used in a base station apparatus capable of communicating with a user equipment terminal in a multi-input multi-output (MIMO) mobile communication system using Pre-coding, the method comprising:
- a receiving step of receiving a Pre-coding Matrix Indicator (PMI) indicating a specific Pre-coding matrix;
- a determining step of determining a value of a flag indicator indicating whether the Pre-coding matrix specified in the PMI is to be used for downlink communications;
- a step of deriving error detection information by performing a predetermined calculation on a calculation target including at least control information and the flag indicator;
- a step of performing a channel-coding process on a data part including the control information, the flag indicator, and the error detection information by treating the data part as a unit of the channel-coding;
- a control signal generating step of generating a downlink control signal including at least the flag indicator; and
- a transmitting step of transmitting a signal including the downlink control signal in downlink.

11. A user equipment terminal capable of communicating with a base station apparatus in a multi-input multi-output (MIMO) mobile communication system using Pre-coding, the user equipment terminal comprising:
- a specification unit configured to specify a Pre-coding matrix to be used for downlink communications;
- a transmission unit configured to transmit a Pre-coding Matrix Indicator (PMI) to the base station apparatus, the PMI indicating the specified Pre-coding matrix;
- a receiving and decoding unit configured to receive a signal including a flag indicator, control information, and error detection information from the base station apparatus, the flag indicator indicating whether the Pre-coding matrix specified in the PMI is to be used for downlink communications, and decode the received signal;
- a derive unit configured to derive error detection information by performing a predetermined calculation on a calculation target including at least the control information and the flag indicator; and
- a determination unit configured to determine whether the Pre-coding matrix specified in the PMI is to be used for downlink communications by comparing the error detection information calculated in the base station apparatus and the error detection information calculated in the user equipment terminal, wherein
whether the PMI is to be included in the calculation target is determined based on a value of the flag indicator.

12. The user equipment terminal according to claim 11, wherein
when the determination unit determines that the Pre-coding matrix specified in the PMI is not to be used for downlink communications, a default Pre-coding matrix already known to both the base station apparatus and the user equipment terminal is selected as the Pre-coding matrix to be used for downlink communications.

13. The user equipment terminal according to claim 11, wherein
the flag indicator is expressed using one bit.

14. The user equipment terminal according to claim 11, wherein
the flag indicator is expressed using more than one bit so as to select any of plural default Pre-coding matrices.

15. The user equipment terminal according to claim 11, wherein
when the value of the flag indicator is a predetermined value, the PMI convolved with the control information is extracted.

16. The user equipment terminal according to claim 11, wherein
the user equipment terminal transmits the PMI and the error detection information derived by performing a predetermined calculation on the PMI to the base station apparatus.

17. A communication control method to be used in a user equipment terminal capable of communicating with a base station apparatus in a multi-input multi-output (MIMO) mobile communication system using Pre-coding, the method comprising:
- a specifying step of specifying a Pre-coding matrix to be used for downlink communications;
- a transmitting step of transmitting a Pre-coding Matrix Indicator (PMI) to the base station apparatus, the PMI indicating the specified Pre-coding matrix;
- a receiving and decoding step of receiving a signal including a flag indicator, control information, and error detection information from the base station apparatus, the flag indicator indicating whether the Pre-coding matrix specified in the PMI is to be used for downlink communications, and decoding the received signal;
- a deriving step of deriving error detection information by performing a predetermined calculation on a calculation target including at least the control information and the flag indicator; and
- a determining step of determining whether the Pre-coding matrix specified in the PMI is to be used for downlink communications by comparing the error detection information calculated in the base station apparatus and the error detection information calculated in the user equipment terminal, wherein
whether the PMI is to be included in the calculation target is determined based on a value of the flag indicator.

* * * * *

UNITED STATES PATENT AND TRADEMARK OFFICE
CERTIFICATE OF CORRECTION

PATENT NO. : 8,422,574 B2
APPLICATION NO. : 12/663980
DATED : April 16, 2013
INVENTOR(S) : Hidekazu Taoka et al.

It is certified that error appears in the above-identified patent and that said Letters Patent is hereby corrected as shown below:

On the title page,

Item (56) References Cited, Other Publications, the reference 3GPP TSG RAN1#50bis, R1-074001; "PMI Downlink Signaling and PDCCH Format"; Motorola; Shanghai, China; October 8-12, 2007 (2 pages) should be added.

Signed and Sealed this
Twenty-fifth Day of June, 2013

Teresa Stanek Rea
*Acting Director of the United States Patent and Trademark Office*